United States Patent
Lu et al.

(10) Patent No.: US 8,338,025 B2
(45) Date of Patent: Dec. 25, 2012

(54) SELF-SEALED METAL ELECTRODE FOR RECHARGEABLE OXIDE-ION BATTERY CELLS

(75) Inventors: Chun Lu, Sewickley, PA (US); Kevin Huang, Export, PA (US); James L. Shull, Murrysville, PA (US); Shih-Yu W. Liu, Pittsburgh, PA (US)

(73) Assignee: Siemens Aktiengesellschaft, München (DE)

( * ) Notice: Subject to any disclaimer, the term of this patent is extended or adjusted under 35 U.S.C. 154(b) by 221 days.

(21) Appl. No.: 12/852,737

(22) Filed: Aug. 9, 2010

(65) Prior Publication Data

US 2012/0034520 A1 Feb. 9, 2012

(51) Int. Cl.
 H01M 4/02 (2006.01)
 H01M 2/16 (2006.01)
 H01M 10/0562 (2010.01)
 H01M 6/18 (2006.01)
 H01M 2/08 (2006.01)
 H01M 4/66 (2006.01)

(52) U.S. Cl. ........ 429/209; 429/137; 429/304; 429/185; 429/245

(58) Field of Classification Search .................. 429/233, 429/217, 246, 209, 406, 403, 491, 102, 184, 429/59, 137, 304; 427/126.3
See application file for complete search history.

(56) References Cited

U.S. PATENT DOCUMENTS

| 3,003,014 A | * | 10/1961 | Philipp et al. | ................... 429/59 |
| 3,005,865 A | * | 10/1961 | Jonsson | ................. 429/184 |
| 3,977,901 A | | 8/1976 | Buzzelli | |
| 4,054,729 A | | 10/1977 | Isenberg | |
| 4,078,125 A | | 3/1978 | Brown | |
| 6,399,247 B1 | | 6/2002 | Kitayama et al. | |
| 7,396,612 B2 | | 7/2008 | Ohata et al. | |
| 2002/0182509 A1 | * | 12/2002 | Tzeng | ................ 429/233 |
| 2004/0202924 A1 | * | 10/2004 | Tao et al. | ................ 429/102 |
| 2006/0063051 A1 | | 3/2006 | Jang | |
| 2007/0037058 A1 | * | 2/2007 | Visco et al. | ................ 429/246 |

FOREIGN PATENT DOCUMENTS

| WO | 02099912 A2 | 12/2002 |
| WO | 03001617 A2 | 1/2003 |

OTHER PUBLICATIONS

"Fire: Servant, Scourge, and Enigma", Hazel Rossotti; Courier Dover Publications, May 17, 2002; p. 90.*
N. Q. Minh, Ceramic Fuel Cells, Journal of American Ceramic Society, vol. 76, No. 3, (1993), pp. 563-588.

* cited by examiner

*Primary Examiner* — Jonathan Crepeau
*Assistant Examiner* — Kenneth Douyette

(57) ABSTRACT

The outer surface of a metal electrode 202 of a rechargeable oxide-ion battery (ROB) cell is covered by its own dense electrolyte 204 and interconnection 206, where the dense electrolyte 204 and interconnection 206 hermetically seal the metal electrode away from oxygen-containing environment to prevent direct contact between active metal and oxygen which would lead to self discharge, thus, producing a self-sealed metal electrode of a ROB cell without introducing additional sealing components.

14 Claims, 3 Drawing Sheets

Reaction Path 1: $Me + xO^{2-} \Longleftrightarrow MeO_x + 2xe^-$

Reaction Path 2: $xO^{2-} \Longleftrightarrow x/2 O_{2(g)} + 2xe^-$
$x/2 O_{2(g)} + Me \Longleftrightarrow MeO_x$ $x/2 O_{2(g)} + 2xe^- \Longleftrightarrow xO^{2-}$

SELF-SEALED METAL ELECTRODE FOR RECHARGEABLE OXIDE-ION BATTERY CELLS

BACKGROUND OF THE INVENTION

1. Field of the Invention

This present invention relates to self-sealed metal electrodes in a rechargeable oxide-ion battery (ROB) cell. More specifically, the invention describes cell component arrangement in which dense electrolyte and interconnections are used to seal a metal electrode, without introducing additional sealing components.

2. Description of Related Art

Electrical energy storage is crucial for the effective proliferation of an electrical economy and for the implementation of many renewable energy technologies. During the past two decades, the demand for the storage of electrical energy has increased significantly in the areas of portable, transportation, load-leveling and central backup applications. The present electrochemical energy storage systems are too costly to penetrate major new markets. Higher performance is required, and environmentally acceptable materials are preferred. Transformational changes in electrical energy storage science and technology are in great demand to allow higher and faster energy storage at lower costs, and longer lifetimes are necessary for major market enlargement. Most of these changes require new materials and/or innovative concepts, with demonstration of larger redox capacities that react more rapidly and reversibly with cations and/or anions.

Batteries are by far the most common form of storing electrical energy ranging from: standard every day lead-acid cells, exotic iron-silver batteries for submarines taught by Brown in U.S. Pat. No. 4,078,125, nickel-metal hydride (NiMH) batteries taught by Kitayama in U.S. Pat. No. 6,399,247 B1, metal-air cells taught in U.S. Pat. No. 3,977,901 (Buzzelli), to Isenberg in U.S. Pat. No. 4,054,729, and to the lithium-ion battery taught by Ohata in U.S. Pat. No. 7,396,612 B2. These latter metal-air, nickel-metal hydride and lithium-ion battery cells require liquid electrolyte systems.

Batteries range in size from button cells used in watches, to megawatt load leveling applications. They are, in general, efficient storage devices, with output energy typically exceeding 90% of input energy, except at the highest power densities. Rechargeable batteries have evolved over the years from lead-acid through nickel-cadmium and nickel-metal hydride (NiMH) to lithium-ion batteries. NiMH batteries were the initial workhorse for electronic devices such as computers and cell phones, but they have almost been completely displaced from that market by lithium-ion batteries because of the latter's higher energy storage capacity. Today, NiMH technology is the principal battery used in hybrid electric vehicles, but it is likely to be displaced by the higher power energy and now lower cost lithium batteries, if the latter's safety and lifetime can be improved. Of the advanced batteries, lithium-ion is the dominant power source for most rechargeable electronic devices.

What is needed is a dramatically new electrical energy storage device that can easily discharge and charge a high capacity of energy quickly and reversibly, as needed. What is also needed is a device that can operate for years without major maintenance. What is also needed is a device that does not need to operate on natural gas, hydrocarbon fuel or its reformed by-products such as $H_2$. One possibility is a rechargeable oxide-ion battery (ROB), as set out application Ser. No. 12/695,386, filed on Jan. 28, 2010.

A ROB comprises a metal electrode, an oxide-ion conductive electrolyte, and a cathode. The metal electrode undergoes reduction-oxidation cycles during charge and discharge processes for energy storage. For example, in discharging mode, the metal is oxidized:

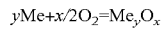
$$y\mathrm{Me} + x/2\mathrm{O}_2 = \mathrm{Me}_y\mathrm{O}_x$$

and is reduced in charging mode:

$$\mathrm{Me}_y\mathrm{O}_x = x/2\mathrm{O}_2 + y\mathrm{Me}, \text{ where Me=metal}.$$

We have found, that for energy storage application, oxide ion must be transported across the electrolyte between metal electrode and cathode to carry electrical charge. Therefore, the metal electrode must be properly sealed heimetically to prevent direct contact with oxygen-containing environment (for example, air). Otherwise, oxygen in air will directly consume the metal without involving charge transfer between electrodes, which will lead to self discharge. High-temperature sealing materials such as glasses and ceramic-glass composites in principle are good candidates for this purpose. However, reliability of high-temperature sealing materials remains questionable upon thermal cycle and long-term operation. Therefore, there is need to design ROB cells whose metal electrode is sealed solely by the cell electrolyte and interconnection without using additional materials for sealing purpose.

SUMMARY OF THE INVENTION

The above need for producing a self-sealed metal electrode for ROB cells is supplied by forming dense electrolyte and interconnection on the outer surface the metal electrode so that direct contact between metal electrode and oxygen-containing environment is eliminated without using additional sealing material.

BRIEF DESCRIPTION OF THE DRAWINGS

For a better understanding of the invention, reference may be made to the preferred embodiments exemplary of this invention, shown in the accompanying drawings in which.

DESCRIPTION OF THE PREFERRED EMBODIMENTS

Figure 1:
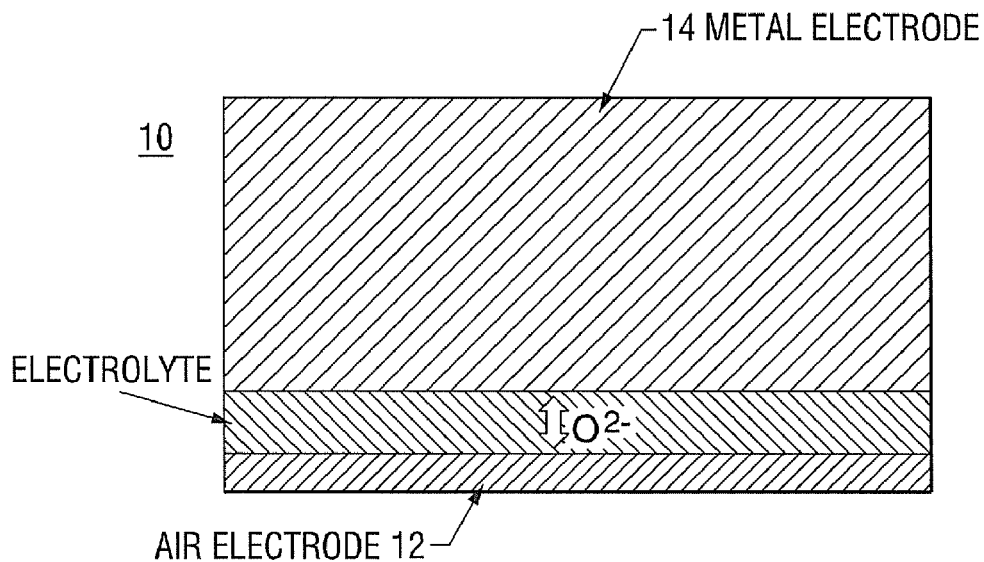
FIG. 1 illustrates the of working principals of a rechargeable oxide-ion battery (ROB) cell.

The working principles of a rechargeable oxide-ion battery (ROB) 10 cell are schematically shown in FIG. 1. In discharge mode, oxide-ion anions migrate from high partial pressure of oxygen side (air electrode—12) to low partial pressure of oxygen side (metal electrode—14) under the driving force of gradient of oxygen chemical potential. There exist two possible reaction mechanisms to oxidize the metal. One of them, as designated as Path 1, in that oxide ion can directly electrochemically oxidize metal to form metal oxide. The other, as designated as Path 2, involves generation and consumption of gaseous phase oxygen. The oxide ion can be initially converted to gaseous oxygen molecule on the metal electrode, and then further reacted with metal via a solid-gas phase mechanism to form metal oxide. In charge mode, the oxygen species, released by reducing metal oxide to metal via electrochemical Path 1 or solid-gas mechanism Path 2, are transported from the metal electrode back to the air electrode.

The metal redox reactions are accompanied by large volume variation, for instance, if manganese (Mn) metal is used, the volume change associated with reaction of $Mn+1/2O_2=MnO$ is 1.73. In the case of tungsten (W), the volume change is 3.39 when W is totally oxidized to $WO_3$. Without appropriately designed electrode, such drastic volume variation in practice can lead to spallation of metal electrode and possible failure of a ROB cell.

Figure 2:
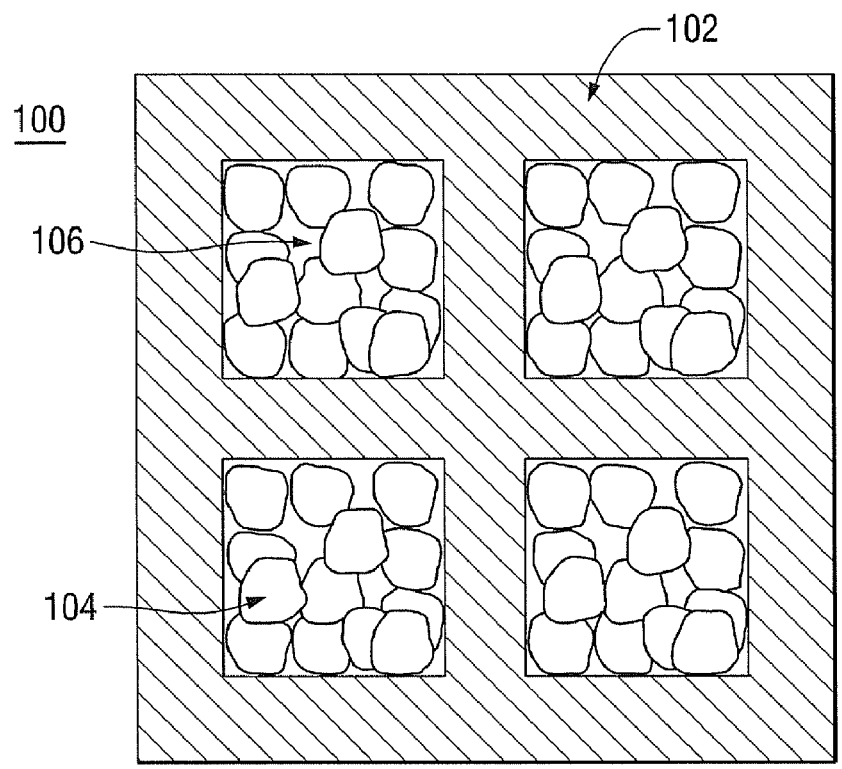
FIG. 2 is a schematic illustration of a metal electrode having a porous skeleton supporting an active metal component.

Therefore, a skeleton-metal electrode structure was invented as shown in FIG. 2 to mitigate the concern regarding the volume change during metal redox processes. The electrode 100 comprises a structural skeleton 102, active metal component 104, and pores 106. The skeleton 102 is made of single and/or multiple components and is capable of conducting both oxide ions and electrons, and it contains reactive metal component 104 in its pores 106. The skeleton maintains structural integrity by accommodating the volume change associated with metal redox reactions in its pores, having porosity ranging from 20 vol. % to 90 vol. %, more preferably 35 vol. % to 65 vol. %.

The skeleton 102 is compatible with EL (electrolyte) and IC (interconnect) in terms of minimal coefficient of thermal expansion mismatch and negligible chemical reactions. The materials for skeleton fabrication include, but are not limited to, doped/undoped $CeO_2$, stabilized zirconia, doped/undoped $La_xSr_{1-x}Ga_yMg_{1-y}O_3$, doped $LaCrO_3$, doped $SrTiO_3$, doped $LaVO_3$, $Gd_2Ti_xMo_{1-x}O_7$, $Sr_2Mg_{1-x}Mn_xMoO_6$, noble metal, stainless steel, and any of their mixtures. Because the skeleton is mixed oxide-ion and electron conductive, it extends active surface area for metal redox reactions and promotes electrode kinetics as a consequence. The supported solid active metal component is comprised of any single-phase metallic material selected from the group consisting of Ti, Ce, Cr, Mn, Fe, Co, Ni, Cu, Mo, and W, and of any two-phase material selected from the group consisting of Ti—$TiO_2$, Ce—$CeO_2$, Cr—$Cr_2O_3$, Mn—$Mn_2O_3$, Mn—$Mn_3O_4$, Mn—MnO, Fe—FeO, Fe—$Fe_3O_4$, Fe—$Fe_2O_3$, Co—CoO, Co—$Co_3O_4$, Co—$Co_2O_3$, Ni—NiO, Cu—$Cu_2O$, Cu—CuO, Mo—$MoO_2$, Mo—$MoO_3$, and W—$WO_3$. The two-phase composition has metal-to-metal oxide ratio ranges from 0:100 to 100:0.

Figure 3:
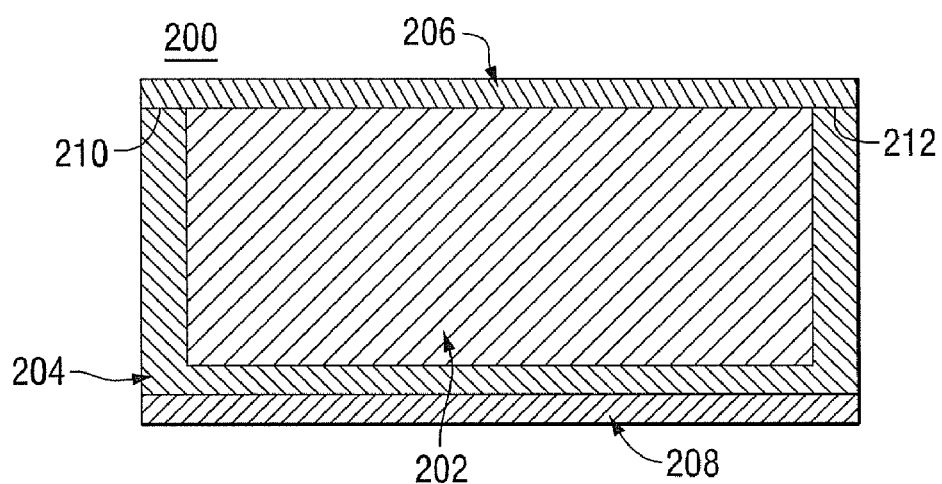
FIG. 3 illustrates one configuration of a ROB cell having a self-sealed metal electrode whose outer surface is covered by dense electrolyte and interconnection.

The metal electrode in a ROB cell must be protected from direct exposure to air, because it will give rise to severe self discharge at high temperature, in other words, metal will be oxidized without supplying power to an external load. As schematically illustrated in FIG. 3, a single ROB cell 200, according to the present invention, can have a gas tight self-sealed feature. The cell 200 consists of metal electrode 202 having a shape, preferably with six sides in three dimension, electrolyte 204, interconnect 206 and cathode 208. As shown in two dimension, the electrolyte has a sealing effect on three sides of the metal electrode 202 to hermetically seal it by contact to the interconnection/interconnect 206 at points 210 and 212. The engineered metal electrode 202 is sealed by using electrolyte 204 and interconnect 206 materials during cell fabrication without any additional seal being required afterward. If other shapes are used, such as a round shape, the electrolyte and interconnect will contact each other at points 210 and 212 to form the seal. The electrolyte can be selected from oxide-ion conductors including doped $CeO_2$, stabilized zirconia, doped/updoped $La_xSr_{1-x}Ga_yMg_{1-y}O_3$, and any of their mixture, while the interconnect can be chosen among metallic noble metal, stainless steels, and electronic ceramic including doped $LaCrO_3$, doped $SrTiO_3$, $LaVO_3$, $Gd_2Ti_xMo_{1-x}O_7$, and $Sr_2Mg_{1-x}Mn_xMoO_6$.

The electrolyte can have a thickness of from 0.1 micrometer to 1.0 millimeter, preferably 1 micrometer to 80 micrometers and most preferably 3 micrometers to 20 micrometers. Over 1.0 millimeter and problems like large cell Ohmic resistance, which negatively influence cell performance, can occur. The interconnect can have a thickness of from 0.1 micrometer to 1 millimeter, preferably 1 micrometer to 500 micrometers, most preferably, 10 micrometers to 150 micrometers.

Figure 4:
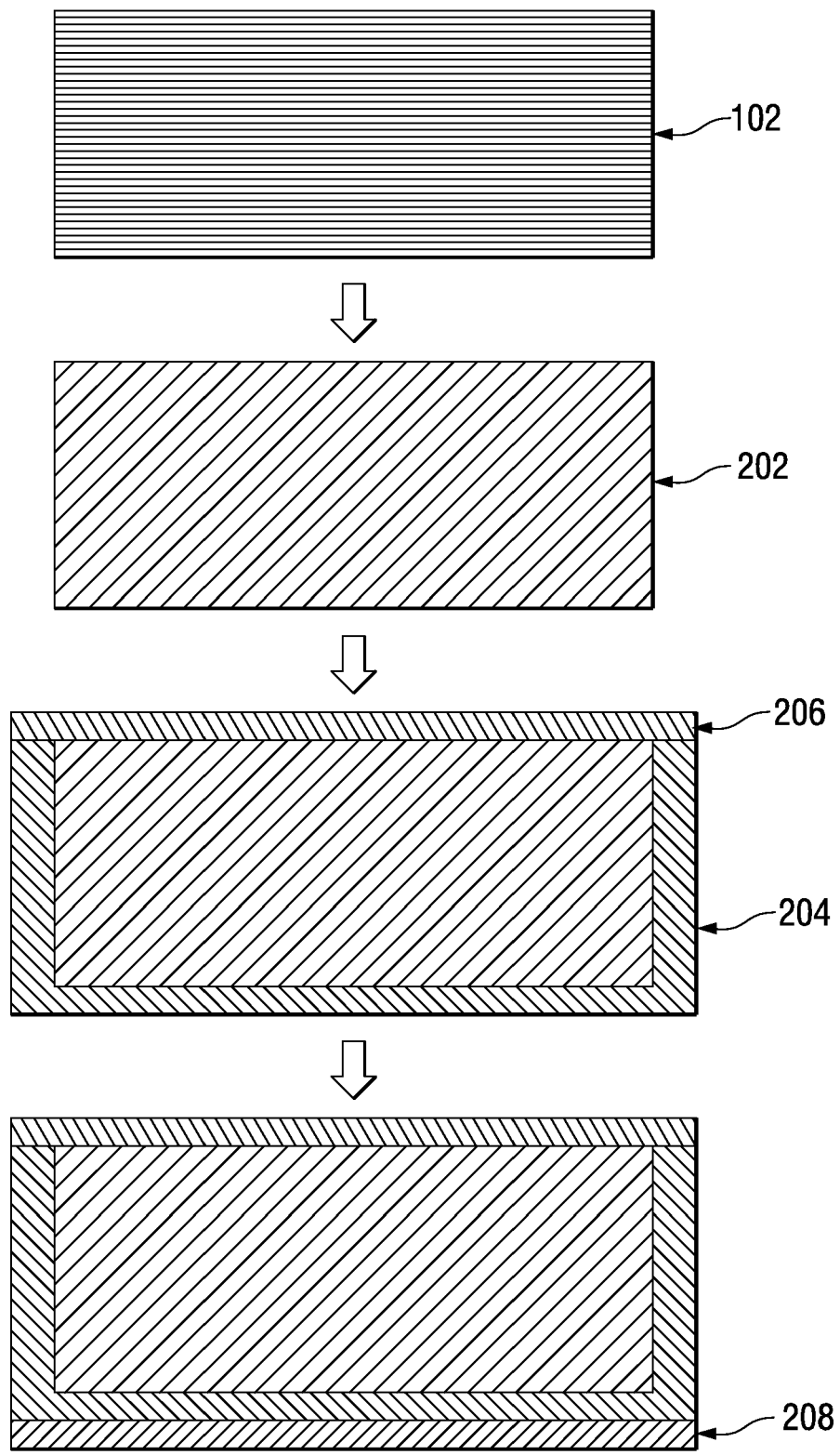
FIG. 4 is a schematic illustration of an exemplary processing procedure for producing a self-sealed metal electrode of a ROB cell.

An exemplary processing procedure for producing a self-sealed metal electrode ROB cell is illustrated in FIG. 4. The porous skeleton 102 is formed by tape casting, tape calendaring, casting, or extrusion. Then active metal component is incorporated into the pores of the skeleton using infiltration/impregnation techniques to yield a skeleton-metal electrode 202. The outer surface of the metal electrode is deposited with electrolyte 204 and interconnect 206 using one or all of dip coating, colloid deposition, or thermal spray techniques. Then, the formed structure is exposed to a densification step during which electrolyte and interconnect reach gastight stage and hence seal the metal electrode away from air. The cathode 208 is then attached to the surface of the electrolyte at low temperature to finish the preparation of a self-sealed metal electrode ROB cell.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A self-sealed metal electrode for rechargeable oxide-ion battery cells comprises:
   a metal electrode having a shape with sides, capable of capturing and releasing oxygen via redox reactions;
   an oxide-ion conductor electrolyte covering part but not all of the outer perimeter surface of the metal electrode to provide oxide-ion transport path; and
   an interconnect covering the outer perimeter surface of the metal electrode not covered by the electrolyte to provide a hermetic seal and to provide an electron transport path.

2. The metal electrode of claim 1, wherein the metal electrode is hermetically sealed away from oxygen-containing environment by the electrolyte and interconnection.

3. The metal electrode of claim 1, wherein the electrolyte is capable of conducting oxide ions, the metal electrode has a shape with four sides and the electrolyte covers three of the sides of the electrode.

4. The metal electrode of claim 1, wherein the electrolyte is selected from the group consisting of doped $CeO_2$, stabilized zirconia, doped/updoped $LaxSr_{1-x}Ga_yMg_{1-y}O_3$, and mixtures thereof, wherein $0<x\leq1$ and $0<y\leq1$.

5. The metal electrode of claim 1, wherein the electrolyte has a thickness of 0.1 micrometer to 1 millimeter.

6. The metal electrode of claim 1, wherein the electrolyte is applied by at least one of dip coating, colloid deposition, vapor deposition, thermal spray technique or any combinations among them.

7. The metal electrode of claim 1, wherein the interconnection is capable of conducting electrons.

8. The metal electrode of claim 1, wherein the interconnection is selected from the group consisting of noble metal, stainless steels, and electronic ceramic including doped $LaCrO_3$, doped $SrTiO_3$, and doped $LaVO_3$.

9. The metal electrode of claim 1, wherein the interconnection has a thickness of 0.1 micrometer to 1 millimeter.

10. The metal electrode of claim 1, wherein the electrolyte and interconnection have the same thickness.

11. A self-sealed metal electrode for rechargeable oxide-ion battery cells comprises:
- a metal electrode having a shape with sides, capable of capturing and releasing oxygen via redox reactions;
- an electrolyte covering part but not all of the outer perimeter surface of the metal electrode to provide oxide-ion transport path; and
- an interconnection selected from the group consisting of metallic noble metal, stainless steels and electronic ceramic, covering the outer perimeter surface of the metal electrode not covered by the electrolyte to provide a hermetic seal and to provide an electron transport path.

12. The metal electrode of claim 11, wherein the electrolyte is capable of conducting oxide ions, the metal electrode has a shape with four sides and the electrolyte covers three of the sides of the electrode.

13. A self-sealed metal electrode for rechargeable oxide-ion battery cells comprises:
- a metal electrode having a shape with sides, capable of capturing and releasing oxygen via redox reactions;
- an oxide-ion conductor electrolyte covering part but not all of the outer perimeter surface of the metal electrode to provide oxide-ion transport path; and
- an interconnection selected from the group consisting of metallic noble metal, stainless steels and electronic ceramic covering the outer perimeter surface of the metal electrode not covered by the electrolyte to provide a hermetic seal and to provide an electron transport path.

14. The metal electrode of claim 13, wherein the electrolyte is capable of conducting oxide ions, the metal electrode has a shape with four sides and the electrolyte covers three of the sides of the electrode.

* * * * *